United States Patent Office 3,158,807
Patented Nov. 24, 1964

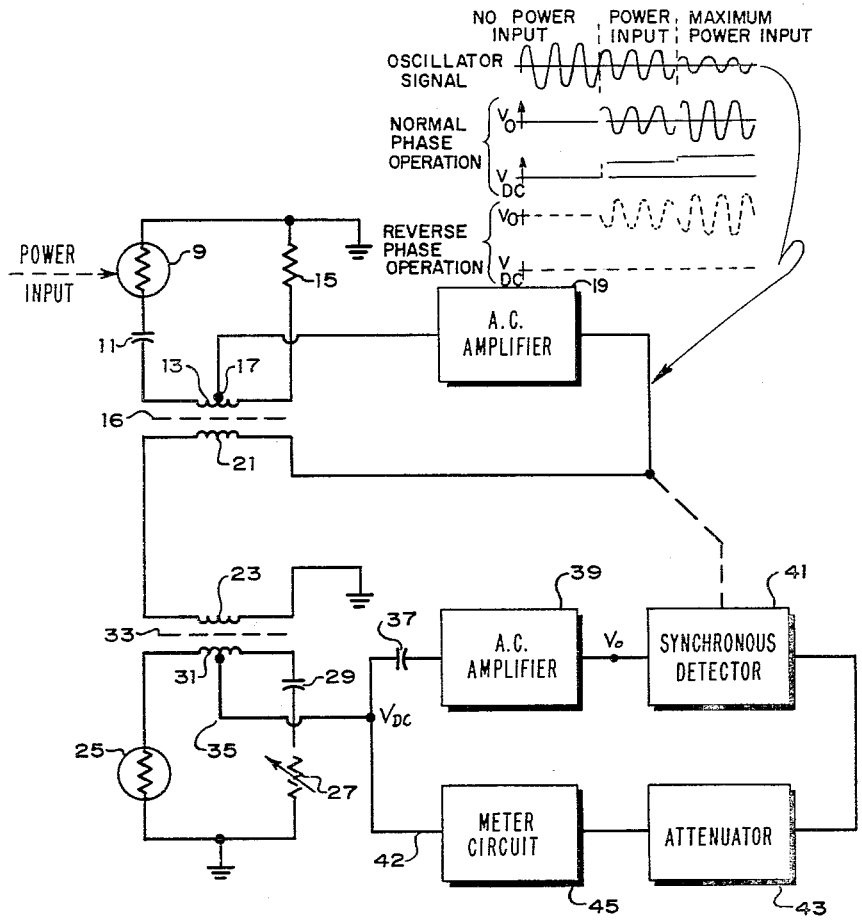

3,158,807
POWER METER USING COUPLED AND AUTOMATICALLY REBALANCED BOLOMETER BRIDGES
Georg C. Jung, Menlo Park, Calif., assignor to Hewlett-Packard Company, Palo Alto, Calif., a corporation of California
Filed Mar. 30, 1961, Ser. No. 99,526
3 Claims. (Cl. 324—106)

This invention relates to power-measuring devices and more particularly to a circuit for measuring accurately the power that is produced by a radiant energy source.

A microwave signal source is frequently used to radiate energy along waveguides to a suitable load. The maximum rate at which energy can be expended at the end of the waveguide is a measure of the total power that is available from the system. For example, if a microwave signal is propagated along several lengths of waveguide, through couplers and other microwave components to a load, then it is desirable to know the power that is delivered to the load. One method of determining this power is to replace the load with a suitable transducer and to measure the heat that is produced therein by the radiant power. A heat-sensitive element, such as a thermistor, may be used to transform the unknown power into electrical resistance. A single bridge circuit including the thermistor may be used to provide an accurate indication of the applied radiant power. The power to be measured is applied to the thermistor, and the bridge circuit is adjusted until the null or balanced condition is obtained. The power indication obtained under the balanced condition is provided in terms of electrical resistance. In addition, since the thermistor is a heat-sensitive device, the indication of radiant power thus provided depends upon the ambient temperature. This circuit configuration not only requires an adjustment before each measurement to compensate for changes in ambient temperature, but also requires additional calculation to obtain the actual value of the measured power.

It is highly desirable to provide a direct reading power-measuring circuit which is insensitive to changes in ambient temperature, and thus a circuit which does not require adjustment before each measurement. This permits accurate measurements to be made with greater ease and speed.

Accordingly, it is an object of the present invention to provide a direct reading power-measuring circuit which is insensitive to changes in ambient temperature.

It is another object of the present invention to provide a power-measuring circuit which operates with high accuracy and sensitivity over a number of power ranges.

It is still another object of the present invention to provide a direct-reading power-measuring circuit with a zero adjustment which can produce positive and negative settings about the zero indication and which can operate uniformly on all power ranges.

In accordance with the illustrated embodiment of the present invention, two thermistor bridge circuits are connected to receive a signal at a pre-determined frequency from an oscillator circuit. The oscillator circuit comprises an amplifier and a positive feedback path which includes the first of the two bridge circuits. The thermistor in the first bridge circuit is adapted to receive the power and operate at a constant temperature. The oscillator circuit thus remains balanced for all input and ambient temperature conditions. As the applied power changes, the oscillation level changes to maintain the power dissipated in the thermistor substantially constant. This change in oscillation level tends to unbalance the second bridge circuit and thus produce a control signal, the amplitude of which is related to the radiant power. The control signal is amplified and metered and is then fed back to the second bridge circuit in a manner which tends to stabilize that circuit about the balanced condition. The second thermistor is thereby maintained at a substantially constant temperature for all input and ambient temperature conditions. The change in the power that is applied to the second thermistor by the control signal is equal to the change in the power that is applied to the first thermistor by the applied power to be measured.

Other and incidental objects of the present invention will be apparent from a reading of this specification and an inspection of the accompanying drawing which shows the schematic diagram of the circuit of the present invention.

Referring now to the drawing, thermistor 9 is adapted to receive the radiant power which is to be measured. A first series circuit including capacitor 11, center-tapped winding 13 of transformer 16, and resistor 15 is connected from one terminal of thermistor 9 to the other. The common terminal of thermistor 9 and resistor 15 is connected to a suitable reference voltage, say ground. The center tap 17 of winding 13 is connected to the input of amplifier 19. The output of amplifier 19 is connected through winding 21 of transformer 16 to winding 13. A second circuit comprising serially connected thermistor 25, resistor 27, and capacitor 29 is connected to the center-tapped winding 31 of transformer 33. The common terminal of thermistor 25 and resistor 27 is connected to ground. Center tap 35 of winding 31 is connected through a coupling capacitor 37 to A.-C. amplifier 39. A synchronous detector 41 is adapted to operate at the frequency of the signal that appears at the output of amplifier 19, and is connected to receive the signal appearing at the output of amplifier 39. The output of synchronous detector 41 is connected through attenuator 43 and meter circuit 45 to center tap 35 of winding 31.

In operation, the feedback circuit which includes thermistor 9 and amplifier 19 operates to maintain the resistance of thermistor 9 at a value that is substantially equal to the resistance of resistor 15. If the resistance value of thermistor 9 is changed by the application thereto of radiant power, then the bridge circuit comprising the halves of winding 13 tends to become unbalanced. This tends to decrease the loop gain around the loop which comprises amplifier 19 and the bridge circuit including in one branch circuit the thermistor 9, capacitor 11 and one half of winding 13 and including in another branch circuit the resistor 15 and the other half of winding 13 on transformer 16. The amplitude of the oscillations decreases and the balanced condition of the bridge circuit is maintained.

The oscillations of reduced amplitude are also applied through transformer 33 to the second bridge circuit comprising thermistor 25. The reduction in the amplitude of the signal that is applied to this second bridge circuit tends to change the resistance value of thermistor 25 and thereby unbalance that bridge circuit. This tendency of the second bridge circuit to unbalance produces a control signal at center tap 35 of transformer winding 31. The control signal is applied through coupling capacitor 37 to the input of A.-C. amplifier 39. A synchronous detector 41 is adapted to operate at the frequency of the signal that is applied to the first and second bridge circuits and is connected to receive the output signal of amplifier 39. This detector operates upon the output signal of amplifier 39 to produce a unidirectional signal (i.e., of one polarity only) having an amplitude which is related to the amplitude of the signal at the output of amplifier 39 for a given one of two possible phase relationships between the outputs of amplifiers 19 and 39. Synchronous detector 41 is required to distinguish between an error signal from the bridge circuit including elements 25, 27, 29 and 31 having a phase relationship indicative of the need for additional power dissipation in thermistor 25 (for which error signal detector 41 produces a unidirectional signal) and an error signal having a phase relationship indicative of the need for less power dissipation in thermistor 25 (for which error signal detector 41 produces no unidirectional signal). If a phase-sensitive detector such as synchronous detector 41 were not used, additional power would be applied to the thermistor 25 for both phase relationships described above and the circuit would become unstable. This direct-current signal is attenuated by attenuator 43, is metered by meter circuit 45, and is applied to thermistor 25 in a direction which tends to maintain the balanced condition of the second bridge circuit.

When no radiant power is applied to thermistor 9, the amplitude of the oscillatory signal is at a maximum. Under this condition, a unidirectional current flowing in line 42 is at a minimum. As the radiant power applied to thermistor 9 increases, the amplitude of the signal that is applied to the first and second bridge circuits decreases, and the unidirectional current in line 42 increases in order to maintain thermistor 25 at a constant value of resistance. The current in line 42 increases substantially as the square root of the power applied to thermistor 9. Meter circuit 45 provides a substantially linear indication of the applied power. The meter circuit may also be adapted to indicate the R.M.S. value of current or voltage applied to thermistor 9. The power indication provided by meter circuit 45 may be accurately calibrated, then, by applying a known D.-C. current or voltage to thermistor 9.

Other circuit arrangements may be used to obtain the same results. For example, it is also possible to apply the oscillatory signal to the primary windings 21 and 23 of the first and second bridge circuit transformers, respectively, when such windings are connected in parallel. This arrangement provides equal signal voltage for each of the two bridge circuits instead of equal signal current, as provided in the arrangement shown in the drawing. An arrangement which provides signal voltages for each bridge circuit requires a meter circuit which monitors the voltage that is fed back to the second bridge circuit. Thus, a meter circuit 45 may be connected to the output terminal of the synchronous detector 41 to indicate the voltage that is fed back where the bridge is supplied with a signal voltage. Resistance bridges may also be used in place of the transformer bridge circuits presently described. They may be used in any configuration which permits signal to be applied to the bridge circuits simultaneously.

Thermistors 9 and 25 have substantially similar power-resistance characteristics and are adapted to operate at the same ambient temperature. Thus, since the incremental changes in temperature for each of the thermistors are substantially the same, the changes in resistance of the thermistors tend to be equal. This permits the bridge circuits to operate in synchronism, independent of changes in ambient temperature.

Capacitor 11 in the first bridge circuit is required to preclude the effect of any direct current signals that may be present in the oscillatory signals. It also permits a direct-current signal to be applied directly to thermistor 9 for calibration purposes, as previously described, and for direct-current substitution measurements. Capacitor 29 in the second bridge circuit is required to inhibit the flow of the D.-C. current through resistor 27. This enables the D.-C. current in line 42 to flow only through thermistor 25. All the power provided by the D.-C. signal is thus dissipated in that thermistor. The power dissipated in thermistor 25 thus serves to maintain the second bridge circuit in the balanced condition.

The error in the indication of applied power that is provided by meter circuit 45 is kept within a maximum allowable percentage of the full-scale indication by the effect of attenuator 43 in the feedback path. The circuit may be arranged to operate over several ranges of applied power by varying the attenuation ratio provided by attenuator 43 in steps. Thus, on high power ranges, the variation in the resistance of thermistor 25 about the working value is within the limits which produce normally acceptable indication error. As the range of operating values decreases, the variation in resistance of thermistor 25 about the working value must also decrease to maintain the error within the same maximum percentage of full scale. It should be noted that the signal available at the center tap 35 of winding 31 is substantially equal to the ratio of the variation in resistance of thermistor 25 about the working value to the value of resistor 27 multiplied by the amplitude of the signal that is applied to the primary winding 23. This signal must also be equal to the D.C. voltage that is applied to the center tap 35 divided by the total gain around the feedback loop. Therefore, the total gain around the feedback loop which is provided by amplifier 39, synchronous detector 41, and attenuator 43 must increase as the sensitivity to applied power is increased. The gain around the feedback loop is readily changed by changing the attenuation ratio provided by attenuator 43. In this manner, the maximum indication error is produced at the full scale end of a given range setting. Since the maximum error which occurs at the full scale indication can be reduced to allowable limits, then all readings over a given range are thus maintained within the acceptable limits. In a typical application where the power ranges are varied in decimal steps, the attenuation steps vary inversely as the square root of 10.

Therefore, the circuit of the present invention provides the means to obtain a direct reading of the power to be measured which is applied to input thermistor 9. In addition, the circuit is made to operate independently of changes in ambient temperature by the operation of two substantially similar bridge circuits. The first bridge circuit, which is included in a positive feedback circuit, controls the operation of the second bridge circuit. This provides isolation for the power-sensing element. The D.-C. signal that is fed back to the second bridge to maintain the balanced condition is thus proportional to the applied power, and is readily measurable.

I claim:

1. A circuit for measuring radiant power, said circuit comprising:

first and second transformers, each having a primary winding and a center-tapped secondary winding;

first and second bolometer elements;

means including the first bolometer element, a first resistor, and the secondary winding of said first transformer and forming a first bridge circuit;

said first bolometer element being adapted to receive said radiant power;

means including the second bolometer element, a second resistor, and a first capacitor serially connected between the end terminals of the secondary winding of said second transformer to form a second bridge circuit;

a first amplifier having an input connected to the center tap on the secondary winding of said first transformer;

means serially connecting the primary windings of said first and second transformers to the output of said first amplifier;

the first amplifier and said first bridge circuit being adapted to produce an oscillatory signal having a selected frequency and having an amplitude related to the unbalance of said first bridge circuit;

a second amplifier;

means including a second capacitor connecting the input of the second amplifier and the center tap on the secondary winding of said second transformer;

detector means connected to the output of the second amplifier and adapted to operate in synchronism with said selected frequency for producing a direct current for a selected phase relationship between the oscillatory signal and the signal at the output of the second amplifier, said direct current having an amplitude related to the amplitude of the alternating signal at the output of the second amplifier;

a direct current connection between the output of said detector means and the center tap on the secondary winding of said second transformer, said first capacitor acting to block said direct current from being dissipated in the second resistor and said second capacitor acting to block said direct current from being dissipated in the input of the second amplifier, whereby said direct current is substantially entirely dissipated in the second bolometer element; and a meter circuit connected to the output of said detector means to provide an indication of said direct current.

2. A circuit for measuring radiant power, said circuit comprising:

first and second transformers, each having a primary winding and a tapped secondary winding;

first and second thermistors;

a source of reference potential;

means including the first thermistor and a first capacitor serially connected between an end terminal of the secondary winding of said first transformer and said source of reference potential;

a first resistor connected between the other end terminal of the last-named winding and said source;

said first thermistor, first capacitor, first resistor and last-named winding forming a first bridge circuit having output terminals at said tap of the last-named winding and said source;

said first thermistor being adapted to receive said radiant power and said first capacitor acting to block direct current from being dissipated in the first thermistor;

means including a second resistor and a second capacitor serially connected between an end terminal of the secondary winding of said second transformer and said source;

means connecting the second thermistor between the other end terminal of the last-named winding and said source;

said second thermistor, second capacitor, second resistor and last-named winding forming a second bridge circuit having output terminals at said tap of the last-named winding and said source;

a first amplifier;

means connecting the input of the first amplifier to receive the signal at the output terminals of the first bridge circuit;

means serially connecting the primary windings of said first and second transformers to the output of said first amplifier;

the first amplifier and said first bridge circuit being adapted to produce oscillatory signal having an amplitude related to the unbalance of said first bridge circuit;

a second amplifier;

means including a third capacitor connecting the input of the second amplifier to receive only oscillatory signal at the output terminals of said second bridge circuit;

a source of direct current connected to be controlled by the output of the second amplifier for supplying a direct current for a selected phase relationship between the oscillatory signal and the signal at the output of the second amplifier, said direct current having an amplitude related to the amplitude of the alternating signal at the output of the second amplifier;

a direct current connection between the output of said source of direct current and said output terminals of said second bridge circuit, said second capacitor acting to block direct current from being dissipated in the second resistor and said third capacitor acting to block direct current from being dissipated in the input of the second amplifier, whereby said direct current is substantially entirely dissipated in the second thermistor; and a meter circuit connected to the output of said source of direct current to provide an indication of the direct current dissipated in the second thermistor.

3. An instrument for measuring power, said instrument comprising:

a signal amplifier;

first and second bolometer elements, each having an impedance which varies with the operating temperature thereof;

a first bridge circuit including said first bolometer element, said first bolometer element being disposed to receive said power;

means including said first bridge circuit and providing a feedback path between the output and the input of the signal amplifier for producing an oscillatory signal having an amplitude that is related to the operating temperature of the first bolometer element;

a second bridge circuit including said second bolometer element;

means connected to the second bridge circuit for applying said oscillatory signal thereto;

detector means connected to receive the oscillatory signal and an unbalance signal from said second bridge and responsive to the unbalance of the second bridge circuit for producing a direct-current signal for a selected phase relationship between said oscillatory signal and the unbalance signal from the second bridge, the direct current signal having an amplitude that is related to the operating temperature of the second bolometer element;

means to apply said direct-current signal to the second bolometer element; and a meter circuit connected to receive said direct-current signal for providing an indication of the amplitude thereof.

References Cited by the Examiner

UNITED STATES PATENTS 2,449,072  9/48  Houghton _____ 324—95
2,565,922  8/51  Howard _____ 324—106

WALTER L. CARLSON, *Primary Examiner.*

BENNETT G. MILLER, *Examiner.*